United States Patent
Lv et al.

(10) Patent No.: US 9,094,970 B2
(45) Date of Patent: Jul. 28, 2015

(54) METHOD FOR ACHIEVING BACKWARD COMPATIBILITY IN LARGE BANDWIDTH WIRELESS NETWORK, AND ACCESS POINT

(75) Inventors: Kaiying Lv, Shenzhen (CN); Bo Sun, Shenzhen (CN); Nan Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 155 days.

(21) Appl. No.: 13/882,189

(22) PCT Filed: Aug. 15, 2011

(86) PCT No.: PCT/CN2011/078431
§ 371 (c)(1),
(2), (4) Date: May 31, 2013

(87) PCT Pub. No.: WO2012/058964
PCT Pub. Date: May 10, 2012

(65) Prior Publication Data
US 2013/0242957 A1   Sep. 19, 2013

(30) Foreign Application Priority Data
Nov. 2, 2010 (CN) .......................... 2010 1 0529963

(51) Int. Cl.
*H04J 3/00* (2006.01)
*H04W 72/04* (2009.01)
*H04W 16/02* (2009.01)
*H04W 48/12* (2009.01)
*H04W 84/12* (2009.01)

(52) U.S. Cl.
CPC .......... *H04W 72/0446* (2013.01); *H04W 16/02* (2013.01); *H04W 48/12* (2013.01); *H04W 84/12* (2013.01)

(58) Field of Classification Search
CPC .............................................. H04W 72/00446
USPC ........................................................ 370/336
See application file for complete search history.

(56) References Cited

U.S. PATENT DOCUMENTS

2002/0061031 A1* 5/2002 Sugar et al. .................... 370/466
2003/0072331 A1* 4/2003 Jou ................................ 370/503
(Continued)

FOREIGN PATENT DOCUMENTS

CN   1890927 A   1/2007
CN   1943175 A   4/2007
(Continued)

OTHER PUBLICATIONS
International Search Report in international application No. PCT/CN2011/078431, mailed on Nov. 24, 2011.
(Continued)

*Primary Examiner* — Gerald Smarth
(74) *Attorney, Agent, or Firm* — Oppedahl Patent Law Firm LLC (57) ABSTRACT

The present disclosure discloses a method for achieving backward compatibility in a large bandwidth wireless network and an Access Point (AP) for solving the technical problem of compatibility between a more effective channelization solution and a plurality of existing channelization solutions. The technical solution of the disclosure is implemented on the basis of time division multiplexing and frequency division multiplexing, and under the time division multiplexing mode, the AP sends/receives wireless frames on channels belonging to a first and a second channelization set respectively and alternately in terms of time according to a communication protocol; and under the frequency division multiplexing mode, the AP independently configures time window parameters and the corresponding main and/or secondary channel parameters on the channels which belong to the first and second channelization sets and are non-overlapped in the frequency domain, and sends/receives the wireless frames. By way of the above solution of the disclosure, the wireless station can establish a large bandwidth wireless network supporting backward compatibility.

14 Claims, 2 Drawing Sheets

(56) References Cited

U.S. PATENT DOCUMENTS

| | | | |
|---|---|---|---|
| 2005/0185671 A1* | 8/2005 | Hansen et al. | 370/466 |
| 2007/0281617 A1* | 12/2007 | Meylan et al. | 455/41.2 |
| 2008/0175166 A1* | 7/2008 | Oerton | 370/254 |
| 2010/0284380 A1 | 11/2010 | Banerjee et al. | |
| 2011/0176580 A1 | 7/2011 | Zhai et al. | |

FOREIGN PATENT DOCUMENTS

| | | |
|---|---|---|
| CN | 101212380 A | 7/2008 |
| CN | 101547527 A | 9/2009 |
| CN | 101569139 A | 10/2009 |
| EP | 2273814 A1 | 1/2011 |
| WO | 2009133935 A1 | 11/2009 |
| WO | 2010002183 A2 | 1/2010 |
| WO | 2010013155 A1 | 2/2010 |

OTHER PUBLICATIONS

English Translation of the Written Opinion of the International Search Authority in international application No. PCT/CN2011/078431, mailed on Nov. 24, 2011.

* cited by examiner

METHOD FOR ACHIEVING BACKWARD COMPATIBILITY IN LARGE BANDWIDTH WIRELESS NETWORK, AND ACCESS POINT

TECHNICAL FIELD

The disclosure relates to the field of wireless communications, and more particularly to a method for achieving backward compatibility during data transmission performed by a device using a large bandwidth channel during communication in a Wireless Local Area Network (WLAN) and an Access Point (AP) for realizing the method.

BACKGROUND

At present, with the rapid development of Wireless Local Area Network (WLAN), the demand for the coverage of the WLAN is growing in the field of wireless networks. The most common WLAN technologies for a series of standards, such as 802.11a, 802.11b and 802.11g are defined in the Institute of Electrical and Electronic Engineers (IEEE) 802.11group; since then, other task groups appear successively to devote to the development of the specification referring to the improvement of conventional 802.11 technology, for example, the 802.11n task group sets a High Throughput (HT) requirement and supports a data rate as high as 600 Mbps; and the 802.11ac task group further puts forward the concept of Very High Throughput (VHT) to increase the data rate to 1 Gbps. A new protocol needs to be backward compatible with the previous protocols.

Figure 1:
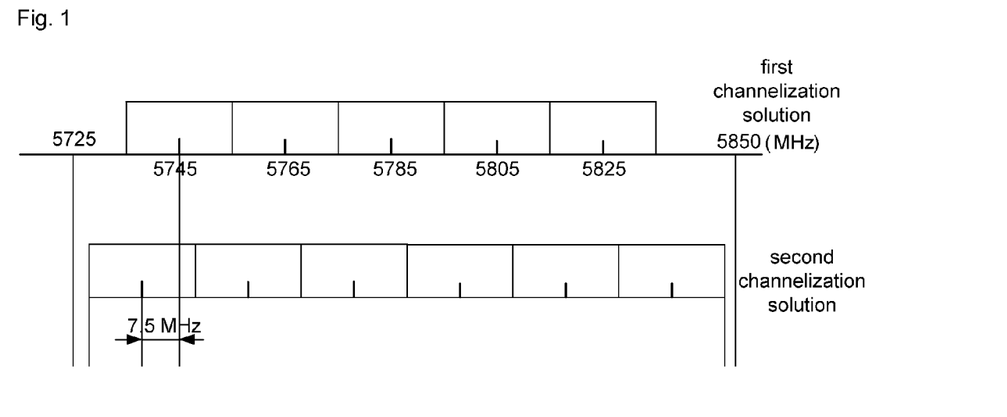
FIG. 1 is a schematic diagram of a first channelization solution and a second channelization solution.

In 802.11, an Access Point (AP) and a plurality of Non-AP STAs associated with the AP make up a Basic Service Set (BSS), as shown in FIG. 1. The WLAN defined by IEEE802.11 uses the Carrier Sense Multiple Access (CSMA) mechanism with Collision Avoidance (CA) to enable multiple points to share a wireless channel.

In IEEE802.11 technology, a channelization set refers to a set consisting of multiple channels of 20 MHz defined from a predefined or fixed start frequency and multiple broadband channels consisting of these channels of 20 MHz in a given frequency band. These channels of 20 MHz making up the set are also called basic channels and other channels consisting of these basic channels are also called broadband channels. A broadband channel includes a basic channel called a primary channel, which is used for broadcasting control information. In a channelization set, each basic channel has a unique channel number.

In the description of the disclosure, available channels refer to a group of non-overlapped basic channels defined in a channelization set or the set of these basic channels; and a working channel refers to an available channel being used or to be used by a wireless device.

In the technology defined by a series of standards of IEEE802.11, a license-free ISM frequency band is channelized into multiple channels of 20 MHz according to the basic channel bandwidth of 20 MHz. An interval of 5 MHz exists between adjacent channel center frequencies; and the channels are numbered according to a given or predefined start frequency. Multiple channels defined above are taken as working channels in IEEE802.11. For example, in a frequency band of 2.4 GHz, fourteen adjacent channels of 20 MHz are defined in IEEE802.11 to serve as available channels; and these available channels and their adjacent available channel have a 5 MHz interval in terms of center frequency, and are overlapped with one another. For another example, in a frequency band of 5 GHz, five channels of 20 MHz between 5.735 GHz and 5.835 GHz are defined in IEEE802.11 to serve as available channels; and these available channels and their adjacent available channel have a 20 MHz interval in terms of center frequency and are not overlapped with one another.

In some cases, the frequency planning of some countries cannot be fully utilized under the definition of channelization. For example, in a frequency band of 5 GHz in China, a frequency band of 125 MHz in total between 5.725 GHz to 5.850 GHz can be used for the WLAN, and the frequency band can be divided into six available channels of 20 MHz by a more effective channelization scheme. Whereas, a problem of center frequency deviation exists between the more effective channelization scheme and the conventional 5 GHz channelization scheme, so that the WLAN equipment cannot perform simple expansion processing on the efficient channelization scheme according to the conventional channelization scheme; and particularly, devices cannot communicate with each other in the conventional way when working in a WLAN according to different channelization schemes.

Therefore, how to design a more effective channelization solution which is compatible with the existing channelization solutions is a problem to be solved in new generation 802.11 protocols based on large bandwidths.

SUMMARY

In view of this, the main purpose of the disclosure is to provide a method and an AP for achieving backward compatibility in a large bandwidth wireless network for solving the technical problem of compatibility between a more effective channelization solution and a plurality of existing channelization solutions.

In order to realize the purpose above, the technical solution of the disclosure is realized by the following way:

a method for achieving backward compatibility in a large bandwidth wireless network includes:

an AP sends/receives wireless frames on channels belonging to a first and a second channelization set respectively and alternately in terms of time according to a communication protocol; the wireless frames includes at least one of the followings: wireless control frames, wireless management frames and data wireless frames.

Further, the method may further include:

a Non-AP STA associated with the AP which only supports the first channelization set or the second channelization set send/receive wireless frames on a channel in the first channelization set or on a channel in the second channelization set according to a communication protocol;

a Non-AP STA associated with the AP which supports the first channelization set and the second channelization set sends/receives wireless frames on a channel in the first channelization set or on a channel in the second channelization set according to a communication protocol.

Further, the method may further include:

the AP sends control and management information and system configuration information or system configuration information belonging to each channelization solution on a primary channel belonging to the first channelization set and a primary channel belonging to the second channelization set respectively and alternately in terms of time.

Further, the AP may send the system configuration information, or the system configuration information and the control and management information through broadcast or unicast and notifies a Non-AP STA associated with the AP that a BSS to which the Non-AP STA belongs performs switching of working channels between the first channelization set and the second channelization set;

the system configuration information may at least include one of the following parameters: primary channel configuration parameters and time window parameters of the BSS working on a corresponding channelization set;

the control and management information may be configured to, in an explicit manner, notify the BSS to perform the switching of the working channels between the first channelization set and the second channelization set.

The time window parameters configured by the AP on channels in the first channelization set and the second channelization set may be configured to indicate a contention interval and a contention free interval on a current working channel; the contention free interval may include a contention free working time on a working channel in a current channelization set and a working time on a working channel in the other channelization set in terms of time.

Further, the method may further include: the AP adjusts time window parameters corresponding to channels in the first channelization set and the second channelization set according to an upper-layer command or a local automatic configuration script.

Further, after the AP sends the control and management information through broadcast or unicast and notifies the Non-AP STA associated with the AP that the BSS performs the switching of working channels, the AP sends a channel reservation message on a current working channel, and then switches to work on a working channel of the other channelization set; or the AP switches to work on a working channel of the other channelization set after a specified time.

Based on the method above, the disclosure further puts forward an AP for achieving backward compatibility in a large bandwidth wireless network. The AP includes:

a control module, configured to control a transmitting and receiving module to send control and management information and system configuration information or system configuration information belonging to each channelization solution on a primary channel belonging to a first channelization set and a primary channel belonging to a second channelization set respectively and alternately in terms of time;

a transmitting and receiving module configured to, under the control of the control module, send/receive wireless frames on channels belonging to the first and the second channelization set respectively and alternately in terms of time according to a communication protocol; wherein the wireless frames includes at least one of the followings: wireless control frames, wireless management frames and data wireless frames.

Further, the transmitting and receiving module may send the system configuration information, or the system configuration information and the control and management information through broadcast or unicast and notifies a Non-AP STA associated with the AP that a BSS to which the Non-AP STA associated with the AP belongs performs switching of working channels between the first channelization set and the second channelization set;

the system configuration information may at least include one of the following parameters: primary channel configuration parameters and time window parameters of the BSS working on a corresponding channelization set; the control and management information is configured to, in an explicit manner, notify the BSS to perform the switching of the working channels between the first channelization set and the second channelization set.

Further, the time window parameters may be configured to indicate a contention interval and a contention free interval on a current working channel; the contention free interval may include a contention free working time on a working channel in a current channelization set and a working time on a working channel in the other channelization set in terms of time.

The control module may be further configured to adjust time window parameters corresponding to channels in the first channelization set and the second channelization set according to an upper-layer command or a local automatic configuration script.

Further, the control module may be further configured to, after the transmitting and receiving module notifies the Non-AP STA associated with the AP that the BSS performs the switching of the working channels, send a channel reservation message on a current working channel, and then control the transmitting and receiving module to switch to work on a working channel in the other channelization set; or directly control the transmitting and receiving module to switch to work on a working channel of the other channelization set after a specified time.

Based on another aspect of the disclosure, the disclosure further puts forward another method for achieving backward compatibility in a large bandwidth wireless network. The method includes:

an AP sends/receives wireless frames on channels which belong to a first channelization set and a second channelization set and are non-overlapped in a frequency domain. The wireless frames may include at least one of the followings: wireless control frames, wireless management frames and data wireless frames.

The AP may independently configure at least one of the following parameters on channels of the first channelization set and the second channelization set: time window parameters, and primary channel parameters.

Further, the method may further include:

a Non-AP STA associated with the AP which only supports the first channelization set or the second channelization set sends/receives wireless frames on a channel in the first channelization set or on a channel in the second channelization set according to a communication protocol;

a Non-AP STA associated with the AP which supports the first channelization set and the second channelization set sends/receives wireless frames on a channel in the first channelization set or on a channel in the second channelization set according to a communication protocol.

Further, the method may further include:

the AP sends a working channel switching message to notify a Non-AP STA associated with the AP which supports the first channelization set and the second channelization set to switch a working channel; the working channel switching message at least includes one of the following information: switching time indication information, target main working channel information and channelization set information of a target working channel.

Further, the method may further include:

a Non-AP STA which only supports the first channelization set or the second channelization set finishes a network access process together with the AP on a channel in the first channelization set or on a channel in the second channelization set according to a communication protocol;

a Non-AP STA which supports the first channelization set and the second channelization set finishes a network access process together with the AP on a channel in the first channelization set or on a channel in the second channelization set according to a communication protocol.

Based on the method above, the disclosure further puts forward another AP for achieving backward compatibility in a large bandwidth wireless network. The AP includes:

a first configuration module configured to independently configure at least one of the following parameters on channels which belong to a first channelization set and a second channelization set and are non-overlapped in a frequency domain: time window parameters, and primary channel parameters;

a first transmitting and receiving module configured to, according to configuration of the first configuration module, independently send/receive wireless frames on a channel belonging to the first channelization set and on a channel belonging to the second channelization set. The wireless frames may include at least one of the followings: wireless control frames, wireless management frames and data wireless frames.

Further, the first transmitting and receiving module is further configured to send a working channel switching message to notify a Non-AP STA associated with the AP which supports the first channelization set and the second channelization set to switch a working channel; wherein the working channel switching message at least includes one of the following information: switching time indication information, target main working channel information and channelization set information of a target working channel.

Through the above solution of the disclosure, a wireless station can establish a large bandwidth wireless network supporting backward compatibility. Other features and advantages of the disclosure will be described in the specification hereinafter and partly become obvious from the specification, or be understood by implementing the disclosure. The objectives and other advantages of the disclosure can be realized and obtained through the structures specified in the specification, claims and accompanying drawings.

DETAILED DESCRIPTION

The disclosure is put forward to solve the problem of center frequency deviation existing between a first channelization solution and a second channelization solution and applied to achieving a new generation large bandwidth WLAN which supports backward compatibility. In the disclosure, a channelization set corresponding to the first channelization solution is named a first channelization set and a channelization set corresponding to the second channelization solution is named a second channelization set. As shown in FIG. 1, the first channelization set includes five basic channels of 20 MHz which take 5 GHz as a start frequency and are defined in the frequency band of 5.735 GHz to 5.835 GHz and conforming to the conventional IEEE802.11 specification, and two channels of 40 MHz and 80 MHz consisting of the basic channels. The second channelization set includes six basic channels of 20 MHz taking 4.9925 GHz as a start frequency and defined in the frequency band of 5.725 GHz to 5.850 GHz and three channels of 40 MHz, one or two channels of 80 MHz and one channel of 120 MHz consisting of the basic channels.

The basic idea of the disclosure is that: an AP sends/receives wireless frames on channels belonging to the first and the second channelization set respectively and alternately in terms of time according to a communication protocol. The sending/receiving of the wireless frames includes sending/receiving of system broadcast messages, wireless frames applied to control and management, and data wireless frames. System configuration information sent by the AP on a primary channel of a channelization set at least includes one of the following parameters: time window parameters of a wireless network working on the channel, and primary channel configuration parameters (optionally including secondary channel configuration parameters). The wireless AP notifies the time window length, i.e. time division of media access control, of a current working channel to a non-access wireless station via a system configuration message or time window parameters in other notification messages. A time window configured by the AP on a channel in a channelization set consists of a contention interval and a contention free interval, wherein the contention interval refers to a time length for accessing a media in a contention manner, i.e. a contention working time, while the contention free interval refers to a time length for accessing a media through control of an AP, i.e. a contention free working time. The AP may work in two channelization sets in a time-sharing mode impliedly by configuring a contention interval and a contention free interval for a working channel flexibly, e.g. a contention free interval of a working channel in a channelization set includes in terms of time a contention free working time on a working channel in the channelization set and a working time including a contention time and a contention free time on a working channel in the other channelization set; or the AP notifies the associated Non-AP STA in an explicit manner that the BSS performs switching of working channels between the first channelization set and the second channelization set through other control wireless management frames sent through broadcast or unicast, e.g. notifying the associated Non-AP STA which supports the two channelization sets that the BSS is to work on a channel in the other channelization set by sending a channel switching message. When the AP currently works on a working channel in the first channelization set, the AP further needs to reserve a channel initiatively before switching the BSS to the second channelization set to avoid a Non-AP STA only supporting the working on a first channel from competing the channel.

In the disclosure, two channelization sets calculate frequencies of basic channels in the sets based on different initial frequencies. As shown in Table 1 and Table 2, the fundamental calculating method is:

center frequency of basic channel=initial frequency+ channel interval×channel number The preferred embodiments of the disclosure are described below with reference to the drawings, and it should be understood that the preferred embodiments herein are intended to describe and explain the disclosure instead of limiting the disclosure. In the case of no conflict, the embodiments of the application and features therein can be combined with each other. In the embodiments of the disclosure, the channel bandwidths referred herein include channel bandwidths of 20

MHz, 40 MHz, 80 MHz, 120 MHz and 160 MHz and other larger channel bandwidths with 20 MHz as a unit.

Figure 2:
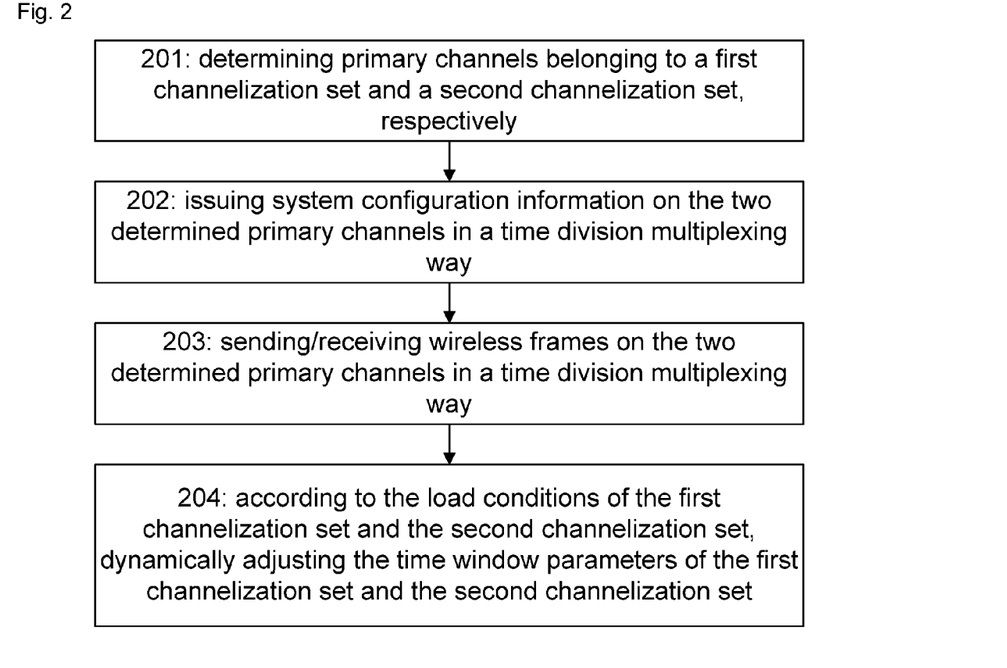
FIG. 2 is a flowchart of a method for achieving backward compatibility in a large bandwidth wireless network according to the disclosure.
Figure 3:
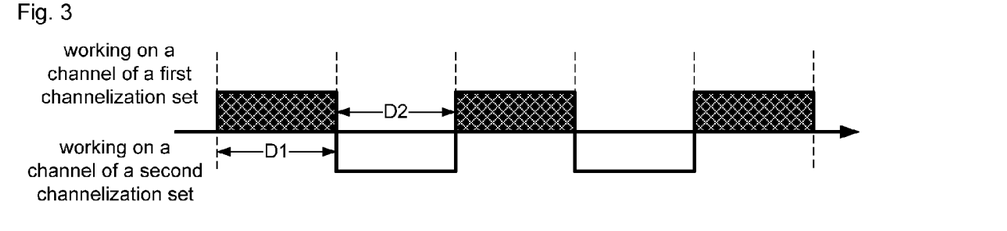
FIG. 3 is a schematic diagram of an AP working on two kinds of channels in a time division multiplexing way according to the disclosure.

FIG. 2 is a flowchart of a method for achieving backward compatibility in a large bandwidth wireless network in which time division multiplexing is performed on two kinds of channelization sets according to the disclosure, specifically including the following steps:

Step 201: primary channels respectively belonging to a first channelization set and a second channelization set are determined;

Step 202: system configuration information is issued on the two determined primary channels in a time division multiplexing way; the system configuration information at least includes the following parameters: primary channel configuration parameters and time window parameters of the BSS working on a corresponding channelization set, and may optionally include secondary channel configuration parameters;

Step 203: wireless frames are sent/received on the two determined primary channels in a time division multiplexing way; as shown in FIG. 3, the wireless frames include at least one of the followings: wireless control frames, wireless management frames, and data wireless frames;

Step 204: the fact that the BSS performs switching of working channels between the first channelization set and the second channelization set is notified through configuring a contention interval and a contention free interval in time window parameters in a system configuration message, or sending control and management information through broadcast or unicast; and Step 205: the time window parameters of the first channelization set and the second channelization set are dynamically adjusted according to the load conditions of the first channelization set and the second channelization set.

The time window parameters are configured to indicate a contention interval and a contention free interval. The contention free interval includes a contention free working time on a working channel in a current channelization set and a working time on a working channel in the other channelization set in terms of time. The contention interval and the contention free interval may be adjusted according to changes of the number of stations or traffic in each channelization set.

When the number of stations or the traffic proportion in the first channelization set and the second channelization set changes, time window parameters of wireless networks working on the first and second channelization sets are adjusted according to proportion.

When all stations working in the first channelization set leaves a network, the working time of the wireless network working on the first channelization set may be reduced, and only a system configuration message, and/or part of control wireless management frames are sent. Correspondingly, the working time of a working channel of the second channelization set will be increased correspondingly, and the wireless frames are still sent, and vice versa. When the second channelization set is in the same conditions, the processing method is the same, which will not be repeated here.

When a station accesses a network on a working channel of the first channelization set, the working time of the wireless network working on the first channelization set may be increased, and the sending of all types of wireless frames including the data wireless frames is recovered. Correspondingly, the working time of a working channel in the second channelization set will be reduced, and the wireless frames are still sent, and vice versa. When the second channelization set is in the same conditions, the processing method is the same, which will not be repeated here.

The disclosure further provides another method for achieving backward compatibility in a large bandwidth wireless network in which time division multiplexing is performed on two kinds of channelization sets. The method includes the following steps:

Step 301: an AP sends/receives wireless frames on channels which belong to a first channelization set and a second channelization set and are non-overlapped in the frequency domain; the wireless frames includes at least one of the followings: wireless control frames, wireless management frames and data wireless frames;

Step 302: the AP independently configures at least one of the following parameters on the first channelization set and the second channelization set: time window parameters and primary channel parameters, and optionally includes secondary channel parameters;

Step 303: a Non-AP STA associated with the AP, which only supports the first channelization set or the second channelization set, sends/receives wireless frames together with the AP on a channel in the corresponding supported first channelization set or second channelization set according to a communication protocol; a Non-AP STA associated with the AP, which supports the first channelization set and the second channelization set, may send/receive wireless frames together with the AP on any current working channel in the two channelization sets according to a communication protocol; and Step 304: the AP may send a working channel switching message to notify the Non-AP STA associated with the AP which supports the two channelization sets to switch a working channel. The working channel switching message at least includes one of the following information: switching time indication information, target main working channel information and channelization set information of a target working channel, and etc.

Figure 4:
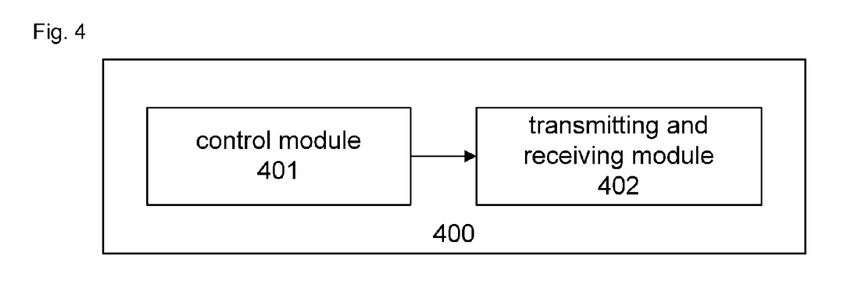
FIG. 4 is a structural diagram of an AP for achieving backward compatibility in a large bandwidth wireless network in a time division multiplexing way according to the disclosure.

FIG. 4 is a structural diagram of an AP 400 for realizing a method for achieving backward compatibility in a large bandwidth wireless network of the disclosure. The AP includes:

a control module 401, configured to control a transmitting and receiving module to send system configuration information belonging to each channelization solution or send system configuration information and control and management information on a primary channel belonging to a first channelization set and a primary channel belonging to a second channelization set respectively and alternately in terms of time;

a transmitting and receiving module 402 configured to, under the control of the control module, send/receive wireless frames on channels belonging to the first and the second channelization set respectively and alternately in terms of time according to a communication protocol; wherein the wireless frames includes at least one of the followings: wireless control frames, wireless management frames and data wireless frames.

The transmitting and receiving module 402 sends the system configuration information, or the system configuration information and the control and management information through broadcast or unicast and notifies a Non-AP STA associated with the AP through the system configuration information or the system configuration information and the control and management information that a BSS to which the Non-AP STA belongs performs switching of working channels between the first channelization set and the second channelization set; the system configuration information at least includes one of the following parameters: primary channel configuration parameters and time window parameters of the BSS working on a corresponding channelization set; the control and management information is configured to, in an explicit manner, notify the BSS to perform the switching of the working channels between the first channelization set and the second channelization set. The time window parameters are configured to indicate a contention interval and a contention free interval. The contention free interval includes the contention free working time on a working channel in a current channelization set and the working time on a working channel in the other channelization set in terms of time.

When time window parameters corresponding to channels in the first channelization set and the second channelization set need to be adjusted, the control module 401 is further configured to adjust the time window parameters corresponding to the channels in the first channelization set and the second channelization set according to an upper-layer command or a local automatic configuration script.

The control module 401 is further configured to, after the transmitting and receiving module notifies the Non-AP STA associated with the AP that the BSS performs the switching of the working channels through sending the control or wireless management frames, send a channel reservation message on a current working channel, and then control the transmitting and receiving module to switch to work on a working channel in the other channelization set; or directly control the transmitting and receiving module to switch to work on a working channel of the other channelization set after a specified time.

Figure 5:
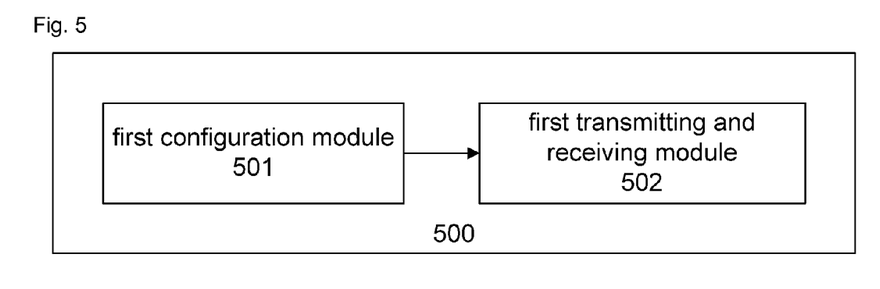
FIG. 5 is a structural diagram of an AP for achieving backward compatibility in a large bandwidth wireless network in a frequency division multiplexing way of the disclosure.

FIG. 5 is a structural diagram of another AP 500 for realizing a method for achieving backward compatibility in a large bandwidth wireless network of the disclosure. The AP includes:

a first configuration module 501 configured to independently configure at least one of the following parameters on channels which belong to a first channelization set and a second channelization set and are non-overlapped in the frequency domain: time window parameters, and primary channel parameters;

a first transmitting and receiving module 502 configured to, according to configuration of the first configuration module 501, independently send/receive wireless frames on a channel belonging to the first channelization set and on a channel belonging to the second channelization set. The wireless frames include at least one of the followings: wireless control frames, wireless management frames and data wireless frames.

The first transmitting and receiving module 502 is further configured to send a working channel switching message to notify a Non-AP STA associated with the AP which supports the first channelization set and the second channelization set to switch a working channel; the working channel switching message at least includes one of the following information: switching time indication information, target main working channel information and channelization set information of a target working channel.

Based on the methods and APs provided by the disclosure, a Non-AP STA which only supports a first or a second channelization set finishes a network access process together with an AP on channels in the first channelization set or the second channelization set according to a communication protocol, and a Non-AP STA which supports the first channelization set and the second channelization set finishes a network access process together with the AP on channels in the first channelization set or the second channelization set according to a communication protocol.

Embodiment 1

Figure 6:
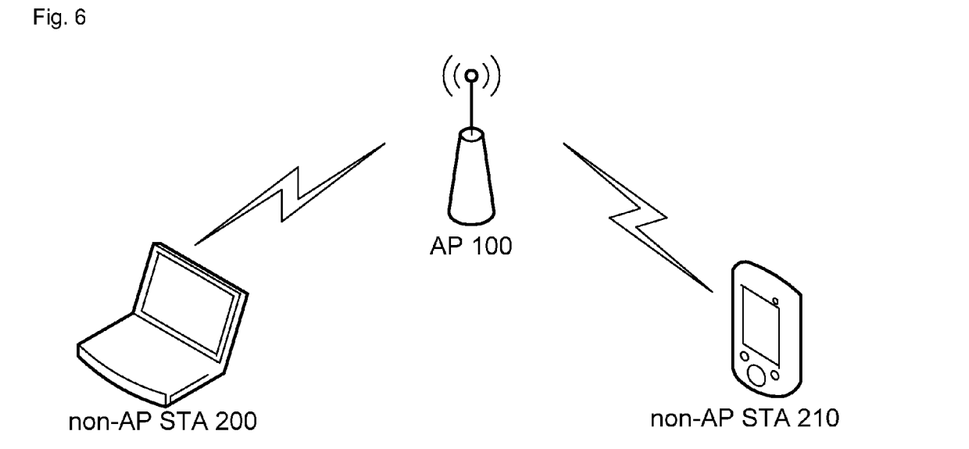
FIG. 6 is a structural diagram illustrating channelization set indication and channel indication.

The present embodiment further illustrates a method for an AP to send/receive wireless frames on channels belonging to a first and a second channelization set respectively and alternately in terms of time according to a communication protocol in the disclosure. A WLAN 001 is included in the present embodiment. The network includes an access station 100 (also called as a wireless AP 100), a non-access station 200 (also called as a Non-AP STA 200) and another non-access station 210 (also called as a Non-AP STA 210), as shown in FIG. 6, wherein the AP 100 supports two channelization solutions, the Non-AP STA 200 supports a first channelization solution and the Non-AP STA 210 supports a second channelization solution. The wireless AP establishes a wireless network by a method which includes the following steps:

the AP 100 determines two primary channels 301 and 302 used currently according to local configuration, or a system predetermined value or a system default value, and these two primary channels belong to a channel of a first channelization set and a channel of a second channelization set, respectively;

the AP 100 sends system configuration messages belonging to the first channelization set and the second channelization set, or system configuration messages and control and management information in a time division multiplexing way, i.e. alternately in terms of time. As shown in FIG. 1, the AP 100 works on a channel of the first channelization set within a time duration D1 and works on a channel of the second channelization set within a time duration D2, and so on alternately.

The AP 100 indicates a region number corresponding to a current frequency planning, a channel planning class identification number to which a primary channel belongs and the number of a primary channel which works currently, in a system configuration message, e.g. a beacon message and a probe_response message, wherein a value can be assigned to the channel planning class identification number according to a method similar to those in the following Table 1:

TABLE 1

| channel planning class identification number | Initial frequency (GHz) | Channel interval (MHz) | Channel set (channel numbers included therein are spaced by commas) |
|---|---|---|---|
| 1 | 5 | 20 | 149, 153, 157, 161, 165 |
| 2 | 5 | 40 | 149, 157 |
| 3 | 5 | 80 | 149 |
| 4 | 4.9925 | 20 | 149, 153, 157, 161, 165, 169 |
| 5 | 4.9925 | 40 | 149, 157, 165 |
| 6 | 4.9925 | 80 | 149, |
| 7 | 4.9925 | 120 | 149 |
| 8 | 4.9925 | 80 | 157 | wherein a channel number indicated by the channel planning class identification number is a channel number corresponding to a channel with the lowest center frequency among a plurality of 20 MHz channels in the channel bandwidth.

The AP 100 sends a system configuration message, e.g. beacon and probe_response, which includes time window parameters on each main (control channel). The time window parameters provide time configuration of a Contention Period (CP) and a Contention Free Period (CFP) of an operation on a channel belonging to the channelization solution, wherein the CP is the time of contention work on the channel. The CFP consists of two parts of time, i.e. the time of working in a contention free manner on the channel and the time of stopping work on the channel, wherein the time of stopping work on the channel is the time during which the AP works on a channel of the other channelization solution. The AP 100 may dynamically adjust the time window parameters according to changes of loads on channels of different channelization solutions.

The AP 100 is allowed to send/receive data on a channelized bandwidth, including the primary channel 301, belonging to the first channelization set; the AP 100 is allowed to send/receive data on a channelized bandwidth, including the primary channel 302, which belongs to the second channelization set. On the primary channel 301, the Non-AP STA 200 establishes association with the wireless network 001 established by the AP 100 and is accessed to the wireless network 001. On the primary channel 302, the AP 210 establishes association with the wireless network 001 established by the AP 100 and is accessed to the wireless network 001.

Through the disclosure, stations supporting different channelization sets can work under the same BSS to achieve backward compatibility.

Embodiment 2

The present embodiment further illustrates a method for an AP in the disclosure to independently configure time window parameters, and send/receive wireless frames on channels which belong to a first and a second channelization set and are non-overlapped in the frequency domain.

A WLAN 001 is included in the present embodiment. The network includes an access station 100 (also called as a wireless AP 100), a non-access station 200 (also called as a Non-AP STA 200) and another non-access station 210 (also called as a Non-AP STA 210). A method for establishing a wireless network by the wireless AP includes the following steps:

the AP 100 determines two currently-used primary channels 301 and 302 used currently according to local configuration, or a system predetermined value or a system default value, and these two primary channels belong to a channel of a first channelization set and a channel of a second channelization set, respectively; in addition, the bandwidth used by wireless frames controlled by the primary channel 301 are not overlapped with the bandwidth used by wireless frames controlled by the primary channel 302 in the frequency domain;

the AP 100 independently sends a system configuration message corresponding to each channel and other control information on the two channels. respectively. In the system configuration message sent on each primary channel, e.g. a beacon message and probe_response information, a region number corresponding to a current frequency planning, a channel planning class identification number to which a primary channel belongs and the number of a primary channel which works currently are indicated, wherein a value can be assigned to the channel planning class identification number according to a method similar to those in the following Table 2:

TABLE 2

| channel planning class identification number | Initial frequency (GHz) | Channel interval (MHz) | Channel set (channel numbers included therein are spaced by commas) |
|---|---|---|---|
| 1 | 5 | 20 | 149, 153, 157, 161, 165 |
| 2 | 5 | 40 | 149, 157 |
| 3 | 5 | 80 | 149 |
| 4 | 4992.5 | 20 | 149, 153, 157, 161, 165, 169 |
| 5 | 4992.5 | 40 | 149, 157, 165 |
| 6 | 4992.5 | 80 | 149, |
| 7 | 4992.5 | 120 | 149 | wherein a channel number indicated by the channel planning class identification number is a channel number corresponding to a channel with the lowest center frequency among a plurality of 20 MHz channels in the channel bandwidth.

The AP 100 sends/receives wireless frames on a channelized bandwidth, including the primary channel 301, belonging to a first channelized solution; independently, the AP 100 sends/receives wireless frames on a channelized bandwidth belonging to a second channelized solution including the primary channel 302.

On the wireless channel 301, the Non-AP STA 200 establishes association with the wireless network 001 established by the AP 100 and is accessed to the wireless network 001.

On the primary channel 302, the Non-AP STA 210 establishes association with the wireless network 001 established by the AP 100 and is accessed to the wireless network 001.

Through the disclosure, stations supporting different channelization sets can work under the same BSS to achieve backward compatibility.

Embodiment 3

A WLAN 001 is included in the present embodiment. The network includes an access station 100 (also called as a wireless AP 100), a non-access station 200 (also called as a STA 200) and another non-access station 210 (also known as a Non-AP STA 210). Steps included in a method for establishing a wireless network by the wireless AP are the same as those in the first embodiment. However, the following operations are further included:

If the AP 100 detects that part of the Non-AP STAs working on a primary channel 301 of a first channelization set leave or switch to a primary channel 302, then the AP 100 shortens the time during which a station uses a channelized bandwidth including the primary channel 301 by adjusting time window parameters according to a upper-layer command or a local automatic configuration script, and correspondingly prolongs the time of a channelized bandwidth including the primary channel 302 to optimize the loads of the bandwidths of the two channelization sets. The AP 100 continues sending/receiving wireless control frames on the channelized bandwidth including the primary channel 301, and sends/receives wireless frames on the channelized bandwidth including the primary channel 302.

If the AP 100 detects that all Non-AP STAs working on the primary channel 301 of the first channelization set leave or switch to the primary channel 302, then the AP 100 may reduces the time of working on the first channelization set by adjusting the time window parameters, and only reserves the time and resources for sending the control frames, so that a new user can be accessed, correspondingly prolongs the working time on the other channelization set and keeps sending wireless frames on the other channelization set.

Contrary to the example above, when a new station is accessed to the network over again and works on the channelization set including 301, then transmission of data frames on 301 is recovered.

Correspondingly, if the AP 100 detects access of a new Non-AP STA to the primary channel 301 of the first channelization set, or all the Non-AP STAs or part of the Non-AP STAs working on the primary channel 302 of the second channelization set leave, the time window parameters are adjusted by applying a similar method to optimize the loads of the bandwidths of the two channelization sets.

The AP 100 sends a modified system message on the channel 301. The modified system message includes modified time window information.

Embodiment 4, a WLAN 001 is included in the present embodiment. The network includes an access station 100 (also called as a wireless AP 100), a non-access station 200 (also called as a Non-AP STA 200) and another non-access station 210 (also known as a Non-AP STA 210), wherein the station 200 supports a first channelization solution, while the station 210 supports the first channelization solution and a second channelization solution. Steps included in a method for establishing a wireless network by the wireless AP are the same as those in the first embodiment. However, the following operations are further included:

The AP 100 works on a channel in the first channelization set currently, and sends a system configuration message and other wireless frames on a corresponding primary channel. The Non-AP STAs 200 and 210 both work on a current working channel. The AP 100 sends a channel switching message to 210, and sends a channel reservation message (CTS-to-self, clear to send to self) to reserve a channel for itself. The reservation time is the time when the AP 100 is to work in the first channelization set, so as to avoid channel contention from the Non-AP STA 210 during the time when the AP 100 works in the second channelization set. After receiving the channel switching message, 210 may switch to a corresponding channel to continue to send and receive wireless frames according to switching time indication information, target main working channel information and channelization set information of the target working channel in the channel switching message, and etc.

After working in the second channelization set for a period of time, the AP 100 may notify the station 210 by sending a channel switching message. The AP 100 may send a channel reservation message (CTS-to-self, clear to send to self) to reserve a channel for itself. The reservation time is the time when the AP 100 is to work in the first channelization set, so as to avoid channel contention from the Non-AP STA 210 during the time when the AP 100 works in the second channelization set. Or the AP does not send a channel reservation message, and the station 210 switches to a target working channel in the first channelization set to continue to send and receive wireless frames according to switching time indication information, target main working channel information, and channelization set information of the target working channel in the channel switching message, and etc.

The above are only preferred embodiments of the disclosure and should not be used to limit the disclosure. For those skilled in the art, the disclosure may have various modifications and changes. Any modifications, equivalent replacements, improvements and the like within the spirit and principle of the disclosure shall fall within the scope of protection of the disclosure.

INDUSTRIAL APPLICABILITY

The disclosure provides a method for achieving backward compatibility in a large bandwidth wireless network and an AP for realizing the method. The technical solution of the disclosure is implemented on the basis of time division multiplexing and frequency division multiplexing, and under the time division multiplexing mode, an AP sends/receives wireless frames on channels belonging to a first and a second channelization set respectively and alternately in terms of time according to a communication protocol; and under the frequency division multiplexing mode, the AP independently configures time window parameters and the corresponding main and/or secondary channel parameters on the channels which belong to the first and second channelization sets and are non-overlapped in the frequency domain, and sends/receives the wireless frames. By way of the above solution of the disclosure, the wireless station can establish a large bandwidth wireless network supporting backward compatibility.

The invention claimed is:

1. A method for achieving backward compatibility in a large bandwidth wireless network, comprising:
   sending/receiving, by an Access Point (AP), wireless frames on channels belonging to a first channelization set and a second channelization set respectively and alternately in terms of time according to a communication protocol, the wireless frames comprising at least one of the followings: wireless control frames, wireless management frames and data wireless frames;
   and the method further comprising:
   sending, by the AP, control and management information and system configuration information or system configuration information belonging to each channelization solution on a primary channel belonging to the first channelization set and a primary channel belonging to the second channelization set respectively and alternately in terms of time;
   wherein the AP sends the system configuration information, or the system configuration information and the control and management information through broadcast or unicast and notifies a Non-AP STA associated with the AP that a Basic Service Set (BSS) to which the Non-AP STA associated with the AP belongs performs switching of working channels between the first channelization set and the second channelization set;
   the system configuration information at least comprises one of the following parameters: primary channel configuration parameters and the time window parameters of the BSS working on a corresponding channelization set;
   the control and management information is configured to, in an explicit manner, notify the BSS to perform the switching of the working channels between the first channelization set and the second channelization set.

2. The method according to claim 1, further comprising:
   sending/receiving, by a Non-AP Station (STA) associated with the AP which only supports the first channelization set or the second channelization set, wireless frames on a channel in the first channelization set or on a channel in the second channelization set according to a communication protocol;
   sending/receiving, by a Non-AP STA associated with the AP which supports the first channelization set and the second channelization set, wireless frames on a channel in the first channelization set or on a channel in the second channelization set according to a communication protocol.

3. The method according to claim 1, wherein
   the time window parameters are configured to indicate a contention interval and a contention free interval on a current working channel; the contention free interval comprises a contention free working time on a working channel in a current channelization set and a working time on a working channel in the other channelization set in terms of time.

4. The method according to claim 3, further comprising:
   the AP adjusts time window parameters corresponding to channels in the first channelization set and the second channelization set according to an upper-layer command or a local automatic configuration script.

5. The method according to claim 1, further comprising:
   the AP adjusts time window parameters corresponding to channels in the first channelization set and the second channelization set according to an upper-layer command or a local automatic configuration script.

6. The method according to claim 1, wherein after the AP sends the control and management information through broadcast or unicast and notifies the Non-AP STA associated with the AP that the BSS performs the switching of working channels, the AP sends a channel reservation message on a current working channel, and then switches to work on a working channel of the other channelization set; or the AP switches to work on a working channel of the other channelization set after a specified time.

7. The method according to claim 1, further comprising:
finishing, by a Non-AP STA which only supports the first channelization set or the second channelization set, a network access process together with the AP on a channel in the first channelization set or on a channel in the second channelization set according to a communication protocol;
finishing, by a Non-AP STA which supports the first channelization set and the second channelization set, a network access process together with the AP on a channel in the first channelization set or on a channel in the second channelization set according to a communication protocol.

8. A method for achieving backward compatibility in a large bandwidth wireless network, comprising:
sending/receiving, by an Access Point (AP), wireless frames on channels which belong to a first channelization set and a second channelization set respectively and are non-overlapped in a frequency domain, the wireless frames comprising at least one of the followings: wireless control frames, wireless management frames and data wireless frames;
the AP independently configures at least one of the following parameters on channels of the first channelization set and the second channelization set: time window parameters, and primary channel parameters;
and the method further comprising:
sending, by the AP, a working channel switching message to notify a Non-AP STA associated with the AP which supports the first channelization set and the second channelization set to switch a working channel: the working channel switching message at least comprises one of the following information: switching time indication information, target primary working channel information and channelization set information of a target working channel.

9. The method according to claim 8, further comprising:
sending/receiving, by a Non-AP STA associated with the AP which only supports the first channelization set or the second channelization set, wireless frames on a channel in the first channelization set or on a channel in the second channelization set according to a communication protocol;
sending/receiving, by a Non-AP STA associated with the AP which supports the first channelization set and the second channelization set, wireless frames on a channel in the first channelization set or on a channel in the second channelization set according to a communication protocol.

10. The method according to claim 8, further comprising:
finishing, by a Non-AP STA which only supports the first channelization set or the second channelization set, a network access process together with the AP on a channel in the first channelization set or on a channel in the second channelization set according to a communication protocol;
finishing, by a Non-AP STA which supports the first channelization set and the second channelization set, a network access process together with the AP on a channel in the first channelization set or on a channel in the second channelization set according to a communication protocol.

11. An Access Point (AP) for achieving backward compatibility in a large bandwidth wireless network, comprising:
a memory storing programming instructions; and
a processor configured to be capable of executing the stored programming instructions to perform steps comprising:
sending control and management information and system configuration information or system configuration information belonging to each channelization solution on a primary channel belonging to a first channelization set and a primary channel belonging to a second channelization set respectively and alternately in terms of time; and
sending/receiving wireless frames on channels belonging to the first and the second channelization set respectively and alternately in terms of time according to a communication protocol; wherein the wireless frames comprises at least one of the followings: wireless control frames, wireless management frames and data wireless frames;
wherein the processor is further configured to be capable of executing the stored programming instructions to perform steps further comprising:
sending the system configuration information, or the system configuration information and the control and management information through broadcast or unicast and notifies a Non-AP STA associated with the AP that a Basic Service Set (BSS) to which the Non-AP STA associated with the AP belongs performs switching of working channels between the first channelization set and the second channelization set;
the system configuration information at least comprises one of the following parameters: primary channel configuration parameters and time window parameters of the BSS working on a corresponding channelization set; the control and management information is configured to, in an explicit manner, notify the BSS to perform the switching of the working channels between the first channelization set and the second channelization set.

12. The AP according to claim 11, wherein
the time window parameters are configured to indicate a contention interval and a contention free interval on a current working channel; the contention free interval comprises a contention free working time on a working channel in a current channelization set and a working time on a working channel in the other channelization set in terms of time;
the processor is further configured to be capable of executing the stored programming instructions to perform steps further comprising: adjusting time window parameters corresponding to channels in the first channelization set and the second channelization set according to an upper-layer command or a local automatic configuration script.

13. The AP according to claim 11, wherein the processor is further configured to be capable of executing the stored programming instructions to perform steps further comprising:
after notifying the Non-AP STA associated with the AP that the BSS performs the switching of the working channels, sending a channel reservation message on a current working channel, and then switching to work on a working channel in the other channelization set; or directly switching to work on a working channel of the other channelization set after a specified time.

14. An Access Point (AP) for achieving backward compatibility in a large bandwidth wireless network, comprising:

a memory storing programming instructions; and a processor configured to be capable of executing the stored programming instructions to perform steps comprising:

independently configuring at least one of the following parameters on channels which belong to a first channelization set and a second channelization set and are non-overlapped in a frequency domain: time window parameters, and primary channel parameters; and independently sending/receiving wireless frames on a channel belonging to the first channelization set and on a channel belonging to the second channelization set; wherein the wireless frames include at least one of the followings: wireless control frames, wireless management frames and data wireless frames;

wherein the processor is further configured to be capable of executing the stored programming instructions to perform steps further comprising:

sending a working channel switching message to notify a Non-AP STA associated with the AP which supports the first channelization set and the second channelization set to switch a working channel: wherein the working channel switching message at least comprises one of the following information: switching time indication information, target primary working channel information and channelization set information of a target working channel.

* * * * *